Dec. 8, 1959 A. R. ROBERT 2,915,825
TAILOR'S MARKING AND MEASURING GUAGE
Filed June 24, 1958
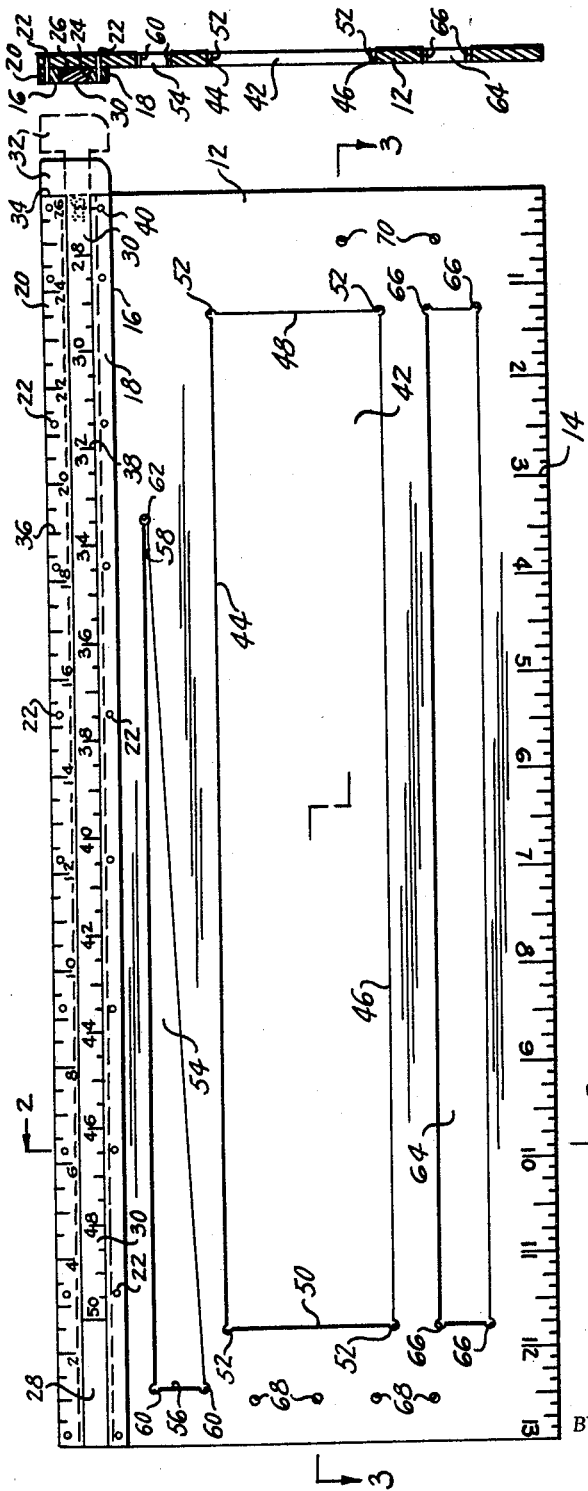
FIG. 1
FIG. 2
FIG. 3
INVENTOR
ALCID R. ROBERT
BY Gustave Miller
ATTORNEY

United States Patent Office 2,915,825
Patented Dec. 8, 1959

2,915,825

TAILOR'S MARKING AND MEASURING GUAGE

Alcid Roland Robert, West Yarmouth, Mass.

Application June 24, 1958, Serial No. 744,133

3 Claims. (Cl. 33—2)

This invention relates to a tailor's marking and measuring guage, and it particularly relates to a guage of this type which can be used for a variety of purposes.

Although various types of tailor's rules have been made heretofore, they were all generally complex, expensive and suited only for very specific purposes.

It is one object of the present invention to provide a tailor's guage device which is simple in construction and easy to use.

Another object of the present invention is to provide a tailor's guage device which is adapted to a variety of purposes with simple manipulations of the device.

Another object of the present invention is to provide a tailor's guage device which can be used to measure double thicknesses in a simple and easy manner.

Other objects of the present invention are to provide an improved tailor's device of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a top plan view of a device embodying the present invention.

Fig. 2 is a sectional view taken on line 2—2 of Fig. 1.

Fig. 3 is a sectional view taken on line 3—3 of Fig. 1.

Referring now in greater detail to the drawing wherein similar reference characters refer to similar parts, there is shown a measuring device, generally designated 10, comprising a flat plate 12 of elongated rectangular configuration. One longitudinal edge of the plate 12 is marked off in one inch lengths to form a linear scale 14 which is thirteen inches in length.

At the opposite longitudinal edge of the plate 12 is a slide rule assembly comprising a channel member 16 formed from two parallel strips 18 and 20 preferably made of sheet aluminum although any other desirable material may be used. The strips 18 and 20 are connected to the plate 12 by means of rivets 22 arranged in series along the length of each strip 18 and 20. The inner surfaces of the strips 18 and 20 are oppositely bevelled, as at 24 and 26 to form a channel 28 which is relatively narrow at the top and wider at the bottom. Slidable in this channel 28 is a slide rule 30 having sides of complementary bevel to the sides of channel 28. The slide rule 30 is provided with a handle 32 at one end, this handle having a flat inner surface 34 adapted to seat flush against the corresponding end of the channel member 16 when the slide rule 30 is fully withdrawn into the channel 28 (as shown in full line in Fig. 1). The channel member 16 is provided with a linear scale 36 wherein each inch is marked as two inches while the slide rule 30 is also provided with a linear scale 38 wherein each inch is marked as two inches.

In the use of the slide rule assembly, when a double thickness of material is to be measured, as for example, a trouser leg, a sleeve or the like, the edge of the plate 12 is placed against the surface of one of the thicknesses with the scale 36 in measuring position. The distance is then measured along scale 36 and the actual double-thick dimension of the material measured is read directly on the scale 36 whereby a distance of, for example, 12 inches on the one surface is read directly on the scale as 24 inches which is the actual dimension of the double-thick material. When the distance is longer than thirteen actual (or twenty-six as shown on the scale 36) inches, the plate 12 is held in the same position with the left end thereof at the left end of the material to be measured, and the slide rule 30 is then pulled out by the handle 32 until the portion of the slide rule adjacent the handle 32 coincides with the end of the distance measured. The total measurement will then be read directly on the scale 38 by means of an indicating mark 40 at the right end of strip 18 (as best shown in Fig. 1).

In the center of the plate 12 is provided an elongated slot 42 of rectangular shape, this slot 42 having two longitudinal edges 44 and 46 and two transverse edges 48 and 50. At each corner of the slot 42 there is provided a notch 52. The slot 42 is illustrated as having a width of 1¾ inches wihch is the width of an ordinary trouser cuff. By placing the plate on each trouser leg with the top edge of guage 12 at the distance from the crotch desired, two marks with tailor's chalk can be made, one corresponding with the edge 44 and the other with edge 46. These marks in the form of lines across the trouser legs will clearly indicate both the length of the trousers and the width of the cuff. If desired, the slot 42 can be made of any other dimension or shape to correspond to different requirements. The plate 12 can be held in fixed position during marking in the slot 42 by pins, tacks or the like, inserted into each notch 52.

Above the slot 42 is provided a relatively narrow slot 54 which tapers from a relatively wide end 56 to a point 58. At each corner of end 56 is a notch 60 while at the point 58 is a notch 62. The notches 60 and 62 are used to hold pins or tacks to hold the plate 12 in place while the slot 54 is used to mark out darts or to mark seams that must be tapered or for similar purposes.

Below the slot 42 is provided a relatively narrow, elongated slot 64 also having notches 66 at each corner for the same purposes as notches 52, 60 and 62. This slot is primarily useful to mark seams for alteration although it may be used for various other purposes.

At one side of the plate 12 are provided four holes 68. These holes are used to mark coat sleeves for placing buttons thereon. On the opposite side of plate 12 are two holes 70 for marking coat sleeves having two buttons thereon instead of four.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed:

1. A tailor's marking and guage device comprising a rectangular plate having a linear scale at one edge and a second linear scale at the opposite edge, said second scale being provided on a channel member, said channel member having a channel therein parallel with the said opposite edge of said plate, and a slidable rule in said channel, said slidable rule having a linear scale thereon of the same dimensions as said second scale but the progressive markings on the scale of said slidable rule being a continuation of the progressive markings on said second scale whereby a withdrawal of said slidable rule out of said channel will effect a continuation of said second scale to a distance proportional to the extent of withdrawal of said slidable rule, the scale on said slidable rule and said second scale having markings corresponding to half the actual linear dimensions on said first linear scale whereby the full dimensions of double thickness material can be read directly on said scales of said slidable rule and its said second scale.

2. The device of claim 1 wherein individually shaped slots are formed in said plate between its edges, said slots having edges serving as guide means for marking.

3. A tailor's marking and guage device comprising a rectangular plate having a linear scale along one edge, a channel member provided along the opposite parallel edge of said plate, said channel member comprising a pair of spaced, parallel strips, one coinciding with the corresponding edge of said plate and one spaced inwardly thereof, said strips defining a longitudinal channel therebetween, a slidable rule longitudinally movable in said channel, coinciding linear scales on said channel member and on said rule with the markings of the scale on said rule forming a continuation of the markings of the scale on said channel member, the markings on the scale of said rule being arranged in reverse linear order to the markings on the scale of said channel member, and an indicating mark on said channel member to coact with the markings of the scale of said rule as said rule is withdrawn from said channel, the scale on said slidable rule and said second scale on said channel member having markings corresponding to half the actual linear dimensions on said first linear scale whereby the full dimensions of double thickness material can be read directly on said channel scale and its said second scale.

References Cited in the file of this patent

UNITED STATES PATENTS

| | | |
|---|---|---|
| 779,882 | Simpson | Jan. 10, 1905 |
| 1,101,119 | Classon | June 23, 1914 |
| 1,497,492 | Engel | June 10, 1924 |
| 1,615,180 | Stewart | Jan. 18, 1927 |
| 2,053,810 | Bisel | Sept. 8, 1936 |
| 2,713,724 | Sanchez | July 26, 1955 |

FOREIGN PATENTS

| | | |
|---|---|---|
| 945,384 | France | Nov. 29, 1948 |